L. SCHILLING.
SPRING WHEEL.
APPLICATION FILED SEPT. 22, 1910.
1,023,098.
Patented Apr. 9, 1912.
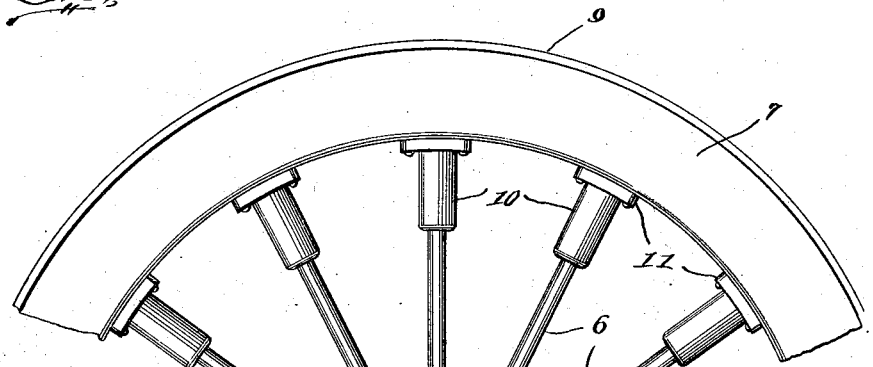
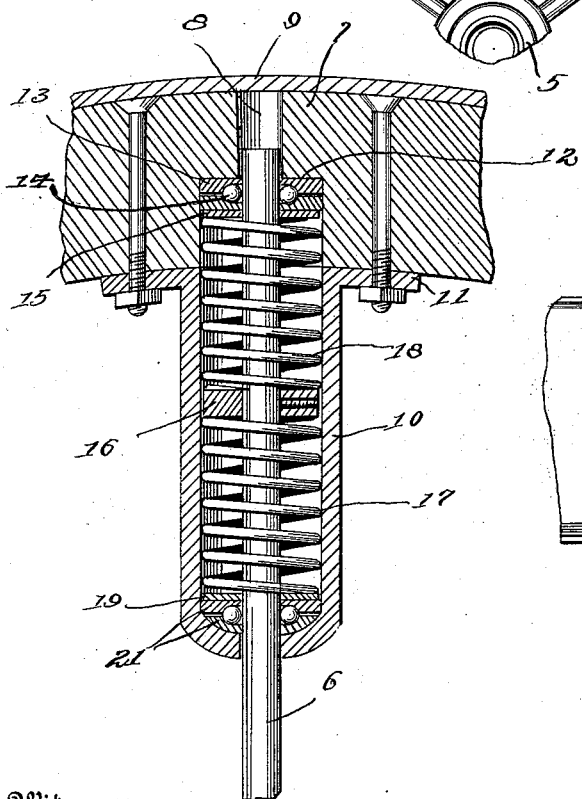
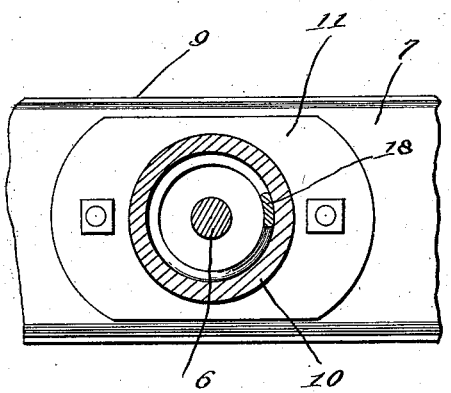
Inventor
Louis Schilling.
Witnesses
Frederich L. Fox
By Victor J. Evans
Attorney

UNITED STATES PATENT OFFICE.

LOUIS SCHILLING, OF MAEYSTOWN, ILLINOIS.

SPRING-WHEEL.

1,023,098.  Specification of Letters Patent.  Patented Apr. 9, 1912.

Application filed September 22, 1910. Serial No. 583,262.

*To all whom it may concern:*

Be it known that I, LOUIS SCHILLING, a citizen of the United States, residing at Maeystown, in the county of Monroe and State of Illinois, have invented new and useful Improvements in Spring-Wheels, of which the following is a specification.

The invention relates to a vehicle wheel and more particularly to the class of spring wheels.

The primary object of the invention is the provision of a wheel of this character in which all strain is relieved therefrom during the travel thereof over uneven surfaces and also that will preclude all jars and shocks to the axle supporting the same, thus preventing the transmission of shocks to a vehicle.

Another object of the invention is the provision of a wheel of this character in which the spokes and other adjunct parts of the said wheel are relieved of strains by reason of the resilient qualities thereof, thus increasing the life of such wheel and assuring durability, strength and thoroughness in operation.

A further object of the invention is the provision of a wheel of this character which is simple of construction and inexpensive in manufacture.

With these and other objects in view, the invention consists in the construction, combination and arrangement of parts, hereinafter fully described, illustrated in the accompanying drawings and pointed out in the claims hereunto appended.

In the drawings:—Figure 1 is a fragmentary side elevation of a vehicle wheel constructed in accordance with the invention. Fig. 2 is a vertical longitudinal sectional view thereof. Fig. 3 is a transverse sectional view on the line 3—3 of Fig. 1.

Similar characters of reference are employed to designate corresponding figures throughout the several views.

Referring to the drawing by numerals, 5 designates the hub of the wheel, 6 the spokes which possess the requisite resiliency and 7 the felly, each being constructed from any suitable material, the felly 7 being provided at intervals with centrally located radially disposed openings 8 which are in alinement with the outer ends of said spokes 6 which extend a distance therein. Upon the outer periphery of the felly 7 is mounted a tire 9 which may be of any ordinary well-known construction and secured thereto in any suitable manner.

Secured to the felly 7 at the inner periphery thereof above each opening 8 therein is a cylindrical shell or tubiform housing 10 fixed at one end to a base plate 11, the bore of the shell or housing opening through said plate and registering with the opening 8 in the felly 7, the opening being formed with an annular shoulder 12 in its wall upon which rests a ball bearing 13 in which are disposed bearing balls 14 on which rests a washer 15 surrounding the spoke 6, the balls being adapted to frictionally engage said spokes when working within the opening 8 and through the housing or shell.

Spaced from the end of each spoke 6 and mounted thereon is an adjustable ring 16 the opposite sides of which engage normally compressed coil tension springs 17 and 18, respectively. The spring 17 has its inner end bearing against the washer 19 surrounding the spoke 6 and resting against bearing balls 20 held within a bearing 21, the latter being engaged with the head of the housing or shell, while the spring 18 has its opposite end bearing against the washer 15, the said springs being adapted to hold the spoke 6 under tension for relieving it and the adjunct part of the wheel from all strain during the travel thereof, thus preventing the transmission of jars or shocks to a vehicle which would otherwise result therefrom. It is obvious that by reason of the adjustability of the ring 16 on the spoke end it will enable the increasing or decreasing of the tension of either spring within the housing or shell as occasion may require.

What is claimed, is:—

A spring wheel comprising a hub, a rim, spokes connecting the rim and hub, said spokes being fixed at their inner ends to said hub, said rim being provided with a plurality of centrally located spaced openings receiving the outer ends of said spokes, each of said openings being formed with an annular shoulder intermediate the ends thereof, cylindrical shells fixed to the inner periphery of the rim and alining with the openings formed by said shoulders for surrounding the spokes, collars adjustably connected with the spokes within the shells, bearings abutting said shoulders and the closed ends of said shells, and surrounding said spokes, washers abutting said bearings, and springs interposed between said washers and the adjustable collars on said spokes.

In testimony whereof I affix my signature in presence of two witnesses.

LOUIS SCHILLING.

Witnesses:
 HERMAN PAPE,
 JACOB DIEHL.

Copies of this patent may be obtained for five cents each, by addressing the "Commissioner of Patents, Washington, D. C."